(12) United States Patent
Berkey et al.

(10) Patent No.: US 7,203,407 B2
(45) Date of Patent: Apr. 10, 2007

(54) RARE EARTH DOPED SINGLE POLARIZATION DOUBLE CLAD OPTICAL FIBER AND A METHOD FOR MAKING SUCH FIBER

(75) Inventors: George Edward Berkey, Pine City, NY (US); Xin Chen, Corning, NY (US); Joohyun Koh, Painted Post, NY (US); Ming-Jun Li, Horseheads, NY (US); Daniel Aloysius Nolan, Corning, NY (US); Donnell Thaddeus Walton, Painted Post, NY (US); Ji Wang, Painted Post, NY (US); Luis Alberto Zenteno, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 27 days.

(21) Appl. No.: 11/058,309

(22) Filed: Feb. 14, 2005

(65) Prior Publication Data
US 2006/0088261 A1    Apr. 27, 2006

Related U.S. Application Data

(60) Provisional application No. 60/621,389, filed on Oct. 21, 2004.

(51) Int. Cl.
*G02B 6/032* (2006.01)
*G02B 6/036* (2006.01)

(52) U.S. Cl. .................. 385/123; 385/125; 385/126
(58) Field of Classification Search .............. None
See application file for complete search history.

(56) References Cited

U.S. PATENT DOCUMENTS

| | | | |
|---|---|---|---|
| 4,184,859 A | 1/1980 | Maklad | 65/2 |
| 4,274,854 A | 6/1981 | Pleibel et al. | 65/2 |
| 4,307,938 A * | 12/1981 | Dyott | 385/123 |
| 4,793,676 A * | 12/1988 | Risk | 385/1 |
| 5,067,793 A * | 11/1991 | Bachmann et al. | 385/127 |
| 5,949,941 A | 9/1999 | DiGiovanni | 385/127 |
| 5,966,491 A | 10/1999 | DiGiovanni | 385/127 |
| 6,411,762 B1 | 6/2002 | Anthon et al. | 385/123 |
| 6,477,307 B1 | 11/2002 | Tankala et al. | 385/127 |
| 6,483,973 B1 | 11/2002 | Mazzarese et al. | 385/123 |
| 6,614,974 B2 * | 9/2003 | Elrefaie et al. | 385/125 |
| 6,954,575 B2 * | 10/2005 | Fermann et al. | 385/128 |
| 6,970,632 B2 * | 11/2005 | Berkey et al. | 385/126 |
| 7,120,340 B2 * | 10/2006 | Berkey et al. | 385/123 |
| 2006/0045446 A1 * | 3/2006 | Berkey et al. | 385/123 |

FOREIGN PATENT DOCUMENTS

GB    2116744 A  *  9/1983

* cited by examiner

*Primary Examiner*—Ellen E. Kim
*Assistant Examiner*—Omar Rojas
(74) *Attorney, Agent, or Firm*—Svetlana Z. Short

(57) ABSTRACT

An optical fiber, comprising: (i) a rare earth doped silica based elongated core with a first refractive index ($n_1$) with an aspect ratio of 1:5 to 1; (ii) a silica based moat abutting and at least substantially surrounding the core, the moat having a refractive index $n_2$, wherein $n_2 < n_1$; (iii) a silica based inner cladding surrounding the moat, the inner cladding having a third refractive index ($n_3$), wherein $n_1 > n_3$; and $n_3 > n_2$; (iv) a silica based outer cladding surrounding said inner cladding, the outer cladding having a fourth refractive index ($n_4$), such that $n_4 < n_3$; the optical fiber exhibits single polarization at the operating wavelength band.

19 Claims, 11 Drawing Sheets

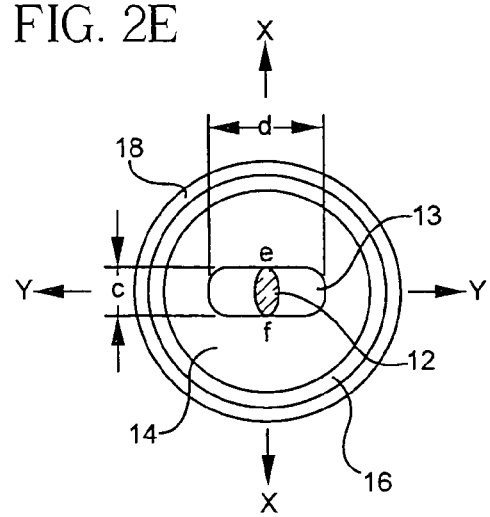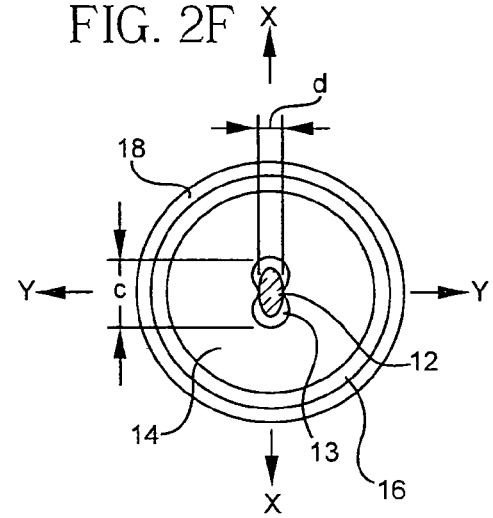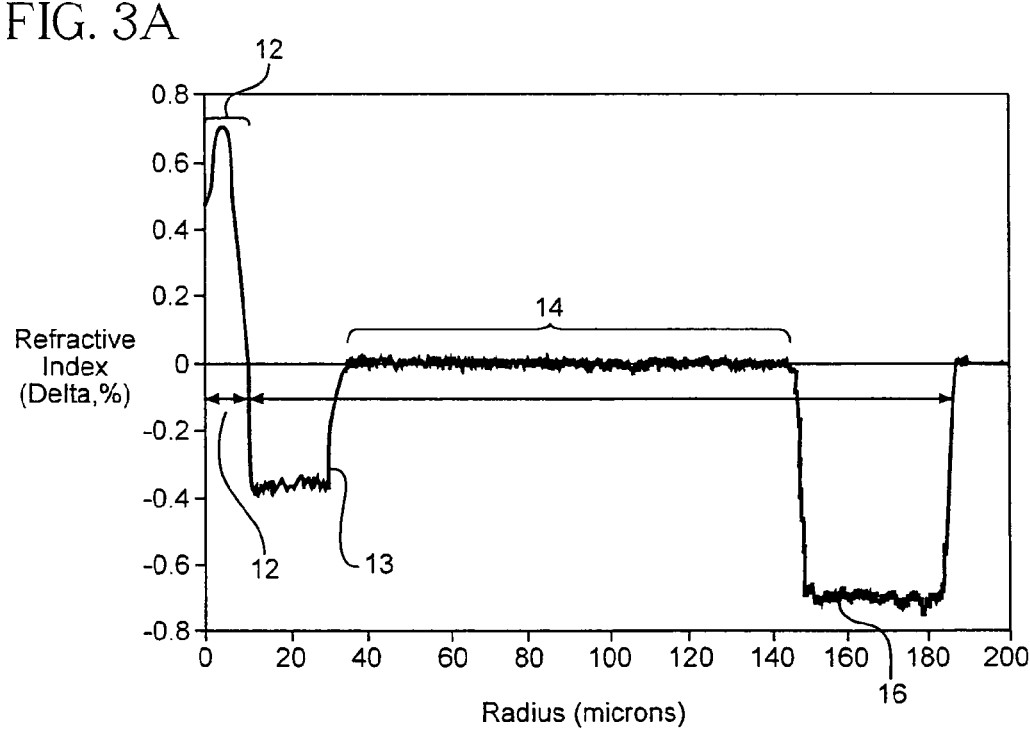

— By He@155'c
-○- By He@155c

-*- Yb2O3
-▲- Al2O3

RARE EARTH DOPED SINGLE POLARIZATION DOUBLE CLAD OPTICAL FIBER AND A METHOD FOR MAKING SUCH FIBER

This Application claims the benefit and priority to U.S. Provisional Patent Application No. 60/621,389, filed Oct. 21, 2004. This Application also claims the benefit and priority to U.S. application Ser. No. 10/930,889, filed on Aug. 30, 2004.

Parts of this invention were made with Government support under Agreement No. MDA972-02-3-004 awarded by DARPA. The Government may have certain rights in some of the claims of the invention.

BACKGROUND OF THE INVENTION

Field of the Invention

The present invention relates generally to optical waveguide fibers, and more particularly to a rare earth doped optical fiber exhibiting single polarization properties.

Technical Background

BACKGROUND OF THE INVENTION

1. Field of the Invention

The present invention relates generally to double clad rare earth doped optical fibers, and particularly to all glass rare earth doped optical fibers suitable for use with high power light sources or in optical fiber lasers and optical amplifiers.

2. Technical Background

Optical fiber has become a favorite medium for telecommunications due to its high capacity and immunity to electrical noise. Single clad rare earth doped optical fiber has been widely used in the field of optical amplifiers and fiber lasers. This type of fiber has low capability of handling high power multimode optical sources due to the difficulty of efficiently coupling multimode light from a high power optical (light) source (also referred to herein as optical pump or pump) into the rare-earth doped fiber core.

To solve this problem and to increase the output power of fiber lasers, those of skill in the art utilize optical fiber with a double clad structure (referred herein as double clad optical fiber). Double clad rare-earth doped optical fiber is a fiber that has a core, an inner cladding layer surrounding the core and an outer cladding layer surrounding the inner cladding layer. Optical fibers with Yb doped cores and two cladding layers surrounding the core are disclosed, for example, in U.S. Pat. Nos. 6,477,307; 6,483,973; 5,966,491 and 5,949,941.

Double clad optical fiber has been used in applications requiring utilization of optical sources providing between 10 to 1000 Watts of optical power, because double clad optical fiber is more efficient in retaining/utilizing optical power provided by the pump than single clad optical fiber. This higher efficiency is due to fiber's utilization of clad-to-core coupling of optical pump power. More specifically, rare-earth doped double clad optical fibers accept light from the optical pump into the inner cladding and then transfer light to the rare-earth doped core through the coupling of pump light between the core and the inner cladding, along the length of the optical fiber. Thus, the optical fiber converts a significant part of the multi-mode light propagated through the inner cladding into a single-mode output at a longer wavelength, by coupling this pump light into the rare-earth doped core.

The inner cladding of the double clad optical fiber has a higher index of refraction than the outer cladding, thus the pump energy is confined inside the inner cladding and is re-directed into the core. The optical fiber is optically active due to the presence of rare-earth dopant in the core, which can be excited to higher electronic energy levels when the optical fiber is pumped by a strong optical pump. Cladding pumping can be utilized in fiber amplifiers, or employed to build high-power single mode fiber pump lasers.

The single-stripe broad-area diode laser remains the most efficient and least expensive pump source. Recent progress in semiconductor laser technology has led to creation of a single-stripe multi mode broad-area laser diodes with output powers of more than 10 Watts.

Recent progress in semiconductor laser technology has led to the creation of light sources utilizing either single stripe broad-area laser diodes or laser diode bars, directly coupled to the intermediate fiber incorporated within the light source. The maximum output power of these light sources is more than 150 Watt at a wavelength of 976 nm at the output end of the intermediate fiber. The intermediate fiber diameter and numerical aperture NA of the light source is 200 μm and 0.22, respectively.

In a double-clad laser, an outer cladding of the optical fiber confines the pump light provided by an optical pump in the optical fiber's multi-mode inner cladding. The much smaller cross-sectional area of the optical fiber's core is typically doped with at least one rare-earth element, for example, neodymium or ytterbium, to provide lasing capability in a single-mode output signal. Typically, a neodymium- or ytterbium-doped double-clad fiber is pumped with one or several high-power broad-area diode lasers (at 800 nm, 915 nm or 976 nm) to produce a single transverse mode output (at the neodymium four-level transition of 1060 nm or the ytterbium four level transition of 1030 nm–1120 nm, respectively). Thus, conventional double-clad arrangements facilitate pumping of the fiber using a multi-mode inert cladding for accepting and transferring pump energy to a core along the length of the device. Double-clad laser output can also be used to pump a cascaded Raman laser to convert the wavelength to around 1480 nm, which is suitable for pumping erbium.

How much pump light can be coupled into a double-clad fiber's inner cladding depends on the inner cladding size and its numerical aperture NA. As is known, the "etendue" (numerical aperture multiplied by the aperture dimension or spot size) of the inner cladding should be equal to or greater than the etendue of the optical pump for efficient coupling. If the numerical aperture and spot size of the optical source (optical pump are) be different in both axes, in order to have better coupling efficiency, the etendue of the inner cladding should be maintained or exceed that of the pump in both the x and y directions.

Typically, a high numerical aperture NA of the inner cladding, which is related to the difference in refractive index between the inner and outer cladding, is desired. In the well-known design, the first clad layer (inner cladding) is made of glass and the second layer (outer cladding) is made of plastic (for example, fluorinated polymer) with relatively low refractive index in order to increase the numerical aperture NA of the inner cladding. Such plastic may not have the desired thermal stability for many applications, may delaminate from the first cladding, and may be susceptible to moisture damage. In addition, this type of double clad optical fiber may be suitable only for sustained use with relatively low power (lower than 20 Watts) optical sources. When high power sources (more than 100 Watts) are utilized, this type of optical fiber heats and the polymer material of the outer cladding layer carbonizes or burns, resulting in device failure, especially when the fiber is bent. At medium powers (20 Watts to below 100 Watts), the polymer outer cladding ages relatively quickly, losing its mechanical and optical characteristics and becoming brittle, thus shortening the device life.

All-glass, Yb doped optical fibers are also known. An example of such fiber is disclosed in U.S. Pat. No. 6,411,762. The disclosed fiber, however, is not suitable for high power applications because it has a relatively low outer cladding diameter and NA, and therefore, low coupling efficiency due to light leakage outside of the optical fiber. That is, a relatively large portion of the light does not enter the optical fiber and is lost. Although this may not be an issue in applications when only a small amount of optical power needs to be coupled into the fiber, such fiber is not efficient for high power applications when the light source power is 100 Watts or more.

Single polarization optical fibers are useful for ultra-high speed transmission systems or for use as a coupler fiber for use with, and connection to, optical components (lasers, EDFAs, optical instruments, interferometric sensors, gyroscopes, etc.). The polarization characteristic (single polarization) propagates one, and only one, of two orthogonally polarized polarizations within a single polarization band while suppressing the other polarization by dramatically increasing its transmission loss.

Improvement in the polarization performance of single mode optical fibers has been achieved by elongating or distorting the fiber core geometry, as a means of decoupling the differently polarized light components. Examples of such optical fiber waveguides with elongated cores are disclosed in U.S. Pat. Nos. 4,184,859, 4,274,854 and 4,307,938. However, the noncircular geometry of the core alone is, generally, not sufficient to provide the desired single polarization properties. It is also noted that this type of optical fiber has relatively low birefringence (i.e., $10^{-5}$ or less). Furthermore, these fibers are not optically active fibers and, therefore are not suitable for use as a laser or an amplifier fiber.

It has, therefore, been an area of ongoing development to obtain an optical fiber that will single polarization performance while being suitable for use as optical amplification medium, and which is also easily manufacturable.

SUMMARY OF THE INVENTION

DEFINITIONS

The following definitions and terminology are commonly used in the art.

Refractive index profile—the refractive index profile is the relationship between the refractive index ($\Delta\%$) and the optical fiber radius (as measured from the centerline of the optical fiber) over a selected portion of the fiber.

Birefringence—birefringence is the difference between the effective refractive indices of the two polarization modes.

Radii—the radii of the segments of the fiber are generally defined in terms of points where the index of refraction of the material used takes on a different composition. For example, the core has an inner radius of zero because the first point of the segment is on the centerline. The outer radius of the core is the radius drawn from the waveguide centerline to the last point of the refractive index of the core having a positive delta. For a segment having a first point away from the centerline, the radius of the waveguide centerline to the location of its first refractive index point is the inner radius of that segment. Likewise, the radius from the waveguide to centerline to the location of the last refractive index point of the segment is the outer radius of that segment. For example, an down-doped annular segment surrounding the core would have an outer radii located at the interface between the annular segment and the cladding.

Relative refractive index percent $\Delta\%$—the term $\Delta\%$ represents a relative measure of refractive index defined by the equation:

$$\Delta\% = 100 \times (n_i^2 - n_c^2)/2n_i^2$$

where $\Delta\%$ is the maximum refractive index of the index profile segment denoted as i, and $n_c$, the reference refractive index, is taken to be the refractive index of the cladding layer. Every point in the segment has an associated relative index measured relative to the cladding.

In accordance with some embodiments of the present invention, an optical fiber is provided which exhibits polarization maintaining (retaining) properties while being suitable for use as an optical amplification media. In accordance with some of the embodiments of the present invention, a rare earth doped optical fiber is provided which exhibits single polarization properties within a Single Polarization Band (SPB). The fiber parameters are preferably selected such that the SPB coincides with an operating wavelength band.

According to the present invention the optical fiber includes a core with a first refractive index $n_1$, a moat least substantially surrounding the core, the moat having the refractive index $n_2$ such that $n_1 > n_2$, a silica based inner cladding surrounding the moat, the inner cladding having a third refractive index $n_3$, wherein $n_1 > n_3$ and $n_3 > n_2$ and a silica based outer cladding surrounding the inner cladding and having a fourth refractive index $n_4$ such that $n_4 < n_3$. The optical fiber exhibits single polarization at the operating (i.e., output) wavelength band.

According to some of the embodiments of the present invention, the core of the optical fiber may include a hole situated inside the core.

One advantage of the optical fiber of the present invention is its capability to produce gain, thus being capable for use in a laser or an optical amplifier while (i) performing as single polarization fiber and exhibiting a single polarization band SPB width of greater than 10 nm and even more preferably greater than 15 nm, and (ii) being capable of handling relatively large amounts of optical power. Another advantage of the optical fiber of the present invention is that because it performs both as a gain fiber and the SP fiber, it eliminates the need to for splicing together gain fiber and the single polarization fiber, thereby reducing the splicing loss, the overall fiber length, while eliminating work and cost associated with splicing the two fibers together.

More particularly it is believed that in these embodiments the effective refractive index of one of the polarizations is such that this polarization cannot propagate within the SPB, while the other orthogonal polarization associated with different effective refractive index is such that this polarization may still propagate in the SPB. Accordingly, single polarization propagation within the SPB is provided by the rare earth doped fiber with a relative simple structure. In some of the embodiments of the optical fibers according to the present invention the SPB width is 20 to 40 nm.

Additional features and advantages of the invention will be set forth in the detail description which follows, and in part will be readily apparent to those skilled in the art from that description or recognized by practicing the invention as described herein, including the detailed description which follows, the claims, as well as the appended drawings.

BRIEF DESCRIPTION OF THE DRAWINGS

FIGS. 2A–2F are schematic cross-sectional views of other embodiments of the present invention;

FIG. 3A illustrates a relative a refractive index profile of an exemplary optical fiber of FIG. 1A;

Figure 1A:
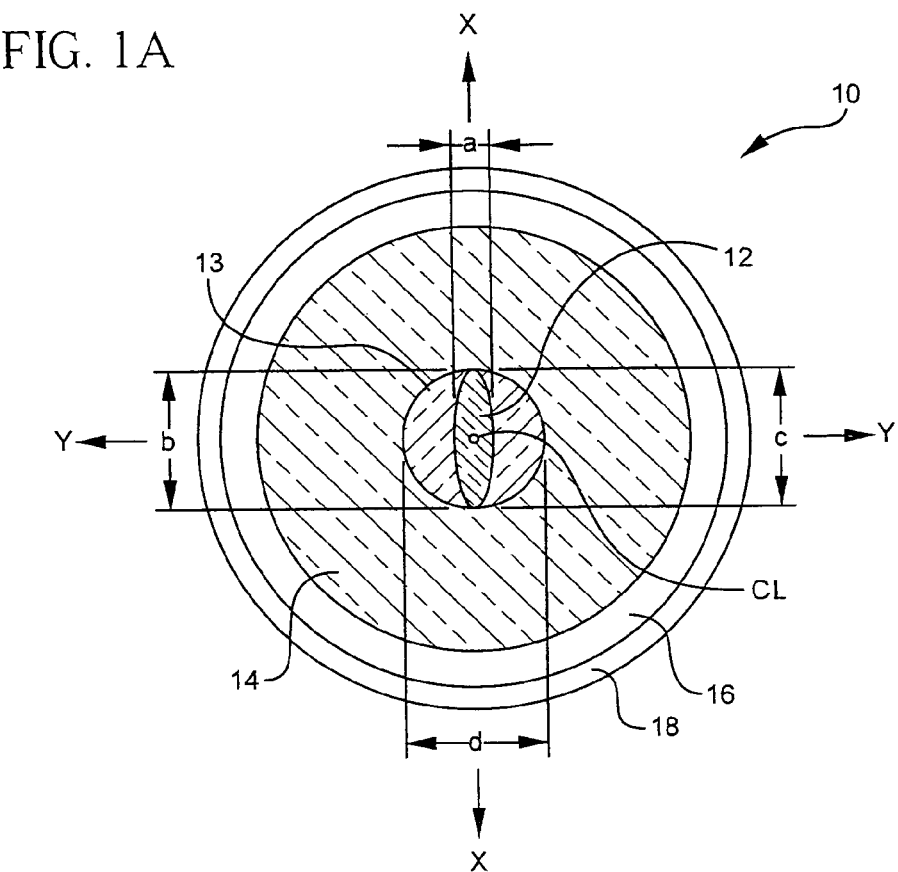
FIG. 1A is a schematic cross-sectional view of one embodiment of the optical fiber according to the present invention.

DETAILED DESCRIPTION OF THE PREFERRED EMBODIMENTS OF THE SINGLE POLARIZATION DOUBLE CLAD OPTICAL FIBER

Reference will now be made in detail to the present preferred embodiments of the invention, examples of which are illustrated in the accompanying drawings. Whenever possible, the same reference numerals will be used throughout the drawings to refer to the same or like parts. One embodiment of double clad single polarization optical fiber in accordance with the present invention is shown schematically in FIG. 1A, and is designated generally throughout by the reference numeral 10. The optical fiber 10 has no air holes situated beyond the fiber core. The optical fiber may have a solid cross section—i.e., it may be completely devoid of holes. The exemplary refractive index profile of this optical fiber is illustrated schematically in FIG. 1B. Alternatively, the optical fiber 10 may include a single air hole 11, which is situated inside the fiber core, as shown in FIG. 1C.

The optical fiber 10 illustrated in FIG. 1A includes: an elongated, silica based, rare earth doped core 12 extending along the longitudinal axis CL of the fiber and having a first index of refraction $n_1$; a silica based moat 13 abutting to and surrounding the core 12 and having a second index of refraction $n_2$, such that $n_1 > n_2$; first silica based cladding 14 (inner cladding) surrounding the moat 13 and having a third index of refraction $n_3$, such that $n_3 > n_2$; and a silica based outer cladding 16 surrounding the first cladding 14 and having a fourth index of refraction $n_4$, such that $n_3 > n_4$. The elongated core 12, in conjunction with the moat 13, enhances or enables single polarization property of this fiber. The core 12, the moat 13, the inner cladding 14 and the outer cladding 16 are made of glass. A protective coating 18 surrounds the outer cladding 16. The outer coating 18 may be, for example, an organic coating which typically includes a softer primary coating and a harder secondary coating applied over the primary coating. It is preferable that either the moat, and/or the inner cladding is non-circular. The core 12 may either be solid, or it may have a center air hole 11, which further enhances single polarization property of this fiber. It is noted that the center hole may be either circular, or non-circular (for example, elliptical).

Figure 1B:
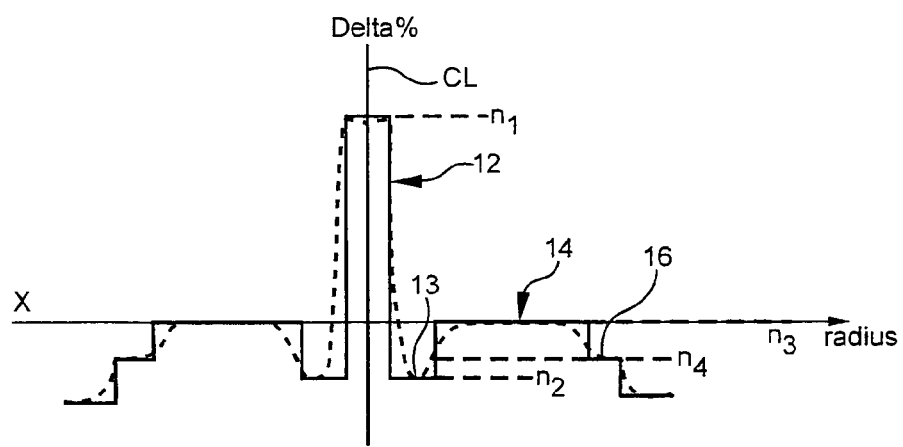
FIG. 1B illustrates schematically refractive index profile of the optical fiber of FIG. 1A.
Figure 1C:
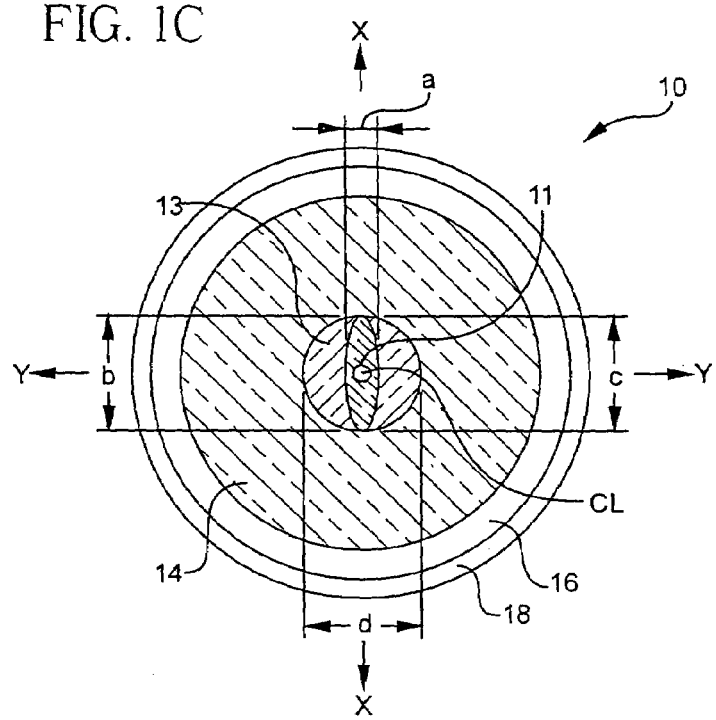
FIG. 1C is a schematic cross-sectional view of another embodiment of the optical fiber according to the present invention.

The elongated core 12 extends radially outward from the centerline, CL, of the fiber 10 and includes up-doped silica having, preferably a step index profile shape. The exemplary refractive index profile of the optical fiber of FIG. 1A is shown in FIG. 1B. Optionally, the core 12 of the fiber 10 may include a graded index shape as shown by the dashed line in FIG. 1B. The core 12 is preferably manufactured from germania (Ge) doped silica, wherein germania is provided in a sufficient amount such that the elongated core 12 exhibits a first refractive index, $n_1$, above the refractive index, $n_3$, of the fiber's inner cladding 14 as best shown in FIG. 1B. Preferably, germania is added in an amount sufficient to provide the elongated core 12 with a maximum relative refractive index %, Δ1 of between 0.2% and 1.0%; more; and most preferably between about 0.2% and 0.5%. In this embodiment the silica based core 12 is also doped with Yb, but other rare earth materials, such as Er may also be utilized.

The optical fiber core 12 is preferably elliptical, as shown in FIGS. 1A, 1C and 2A–2E, but may have other elongated shapes. The elongated shape renders this fiber a single polarization (SP) fiber. The core 12 has a long or maximum dimension, b, and a short or minimum dimension, a, measured orthogonally across the fiber relative to the fiber's longitudinal axis; the a and b dimensions being measured generally orthogonal to each other. The term "elongated" includes core shapes such as: generally oblong, oval, elliptical, diamond-shaped, or the like. Such core elongation is believed to provide at least some level of form (or geometrical as well as stress induced) birefringence to the fiber 10. Preferably, the extent of elongation is controlled during fiber processing (e.g., redraw) such that the elongated core 12 of the drawn optical fiber 10 exhibits the desired aspect ratio, AR, defined herein as b/a. Preferably, the AR of the core 12 is greater than 1.5; more preferably between 1.5 and 10.0; more preferably in the 1.8 to 5.0 range; and in a large percentage of the embodiments, in the 1.9 to 3.5 range, because these aspect ratios improve birefringence of the core 12. If the core 12 includes an air hole 11, the air hole 11 may either be circular, or non circular, such that it has a long or maximum dimension, b', and a short or minimum dimension, a', measured orthogonally across the fiber relative to the fiber's longitudinal axis; the a' and b' dimensions being measured generally orthogonal to each other. It is preferable that the air hole 11 is situated in the center of the core 12, around the centerline (CL).

The lateral dimensions, a, and, b, of the elongated core 12 are preferably designed to be in the range between 1.0 to 13.0 microns. It is preferred that the dimension a be between 1 and 6 microns (more preferably a=1.0 to 4.0 microns), and that dimension b be between 3.0 to 20.0 microns (more preferably b=3.0 to 13.0 microns), respectively. Furthermore, the average diameter, $D_{avg}=\{a+b\}/2$, of the core 12 is preferably between about 2.0 and 13.0 microns; more preferably between 2.0 and 8.0 microns. Alternatively, the core 12 may have a circular cross-section and contain a center hole 11. If the core 12 is circular, the preferred radius of the core 12 is 2 to 8 microns, more preferably 3 to 7 microns.

The core 12 delta is preferably less than 0.5% Δ. The numerical aperture NA of the core 12 is between 0.05 (for high power laser application) and 0.25 (for lower power application). The numerical aperture NA of the core 12 is defined as $(n_1^2-n_2^2)^{1/2}$, where $n_1$ is the index of refraction of the core 12 and $n_2$ is the index of refraction of moat 13.

As shown in FIG. 1A, the fiber core 12 is abutted by the moat 13. The moat 13 and the outer cladding 16 preferably include index lowering dopant(s), such that $n_2<n_3$ and $n_3>n_4$. Most preferably, the moat 13 is down-doped relative to pure silica, and has, therefore, a negative relative refractive index (as compared to that of the inner cladding). Most preferably, the moat 13 is manufactured from fluorine—or boron-doped silica, or combinations thereof. Furthermore, the moat 13 may include any combination of F, B and P. The moat 13 preferably exhibits a relative refractive index %, Δ2, which is negative (less than that of the inner cladding 14); preferably more negative than about −0.15%; more preferably between about −0.15% and −1.0%; and most preferably between −0.3% and −0.8%. The moat 13 may be either circular or elongated (for example, elliptical). Generally, the glass in the moat 13 is doped such that it is appreciably less viscous at the desired draw temperature than is the elongated core 12 or the inner cladding 14.

It is preferable that the moat 13 substantially enclose the core 12. The moat 13 may be larger than the core 12, thus totally surrounding the core 12, or may be the same size as the core, along one of the axis, so as to be tangent to the core 12 along that axis.

Figure 2A:
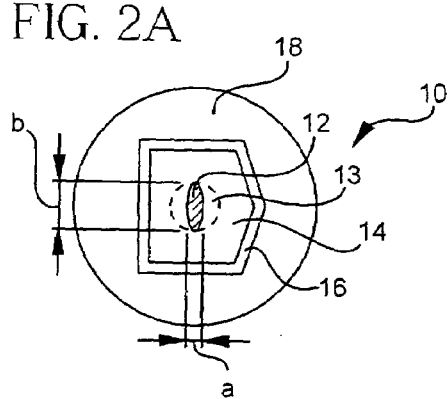
Figure 2B:
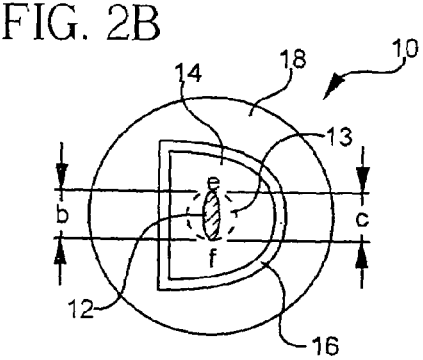
Figure 2C:
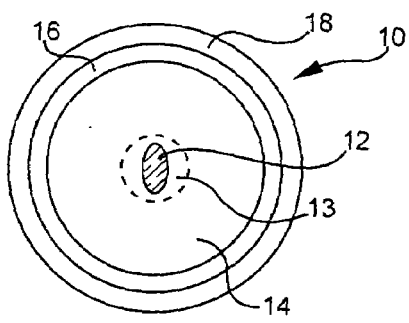
Figure 2D:
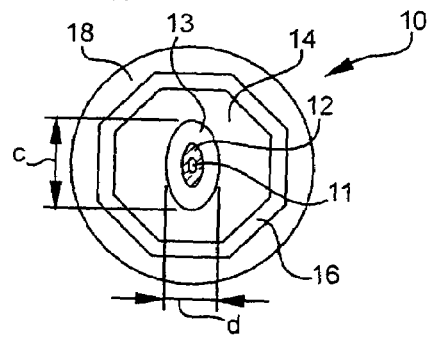

The moat 13 is generally circular in shape as illustrated by FIGS. 2A–2C or the outer dimension, d, may be slightly smaller than the outer dimension, c (See FIG. 2D). In this embodiment, the radially transverse dimensions, c, and, d, are such that the ratio of d/c is between about 0.7 and 0.95. In all embodiments, the laterally-extending core 12 is preferably substantially centered within the moat 13. As stated above, in some embodiments, the outside portion of the moat 13 is configured to be substantially tangent to the core 12 at the maximum or long dimension location, b, of the elongated core 12 (as shown in FIGS. 1A, 2A and 2B). In other words, for these tangent embodiments, the c/b ratio is approximately equal to 1.0.

The inventors herein discovered that the proper combination of sizes and shapes (ratios) of the core 12 and moat 13 provide the fiber's excellent single polarization properties. In particular, the combination of a/b and d/a ratios are believed to be important to optimize single polarization capability. In operation, because of the geometry and materials used in the core 12 and moat 13 it is believed that the effective refractive indices associated with each orthogonal polarization state are substantially different within the SPB. In particular, it should be recognized that the effective refractive index within the SPB 60 of the one polarization state is such that propagation occur within the SPB, while the other polarization mode is very lossy because its effective refractive index so close to cladding (preferably equal to or less than cladding) that it does not effectively propagate (is cut off) within that range of wavelengths of the SPB, i.e., it is not a waveguide.

Alternatively, as best shown in FIGS. 2D and 2F, the moat 13 may be configured to have other generally-elongated shapes, such as oval or elliptical, or rounded rectangular shape, etc. The minimum dimension, c, of the moat 13, measured along axis (X—X) and aligned with the dimension, b, may be preferably substantially equal to the maximum dimension, b, of the core 12 (i.e., b/c=1.0). The dimension, c, is preferably aligned along the same axis with the maximum dimension, b, of the core 12 (along X—X) such that the core and moat 13 become tangent at points e and f (See FIGS. 2B and 2E).

It is also important to recognize that in all embodiments described herein, the ratio of the dimension, d, (along axis (Y—-Y) of the moat 13 to the minimum dimension, a, of the elongated core 12, namely the ratio d/a, is preferably in the range of between 2.0 to 7.0; more preferably 2.5 to 5.0; and in a large number of the embodiments, 2.5 to 4.0. Again, maintaining this d/a ratio was discovered to be one important factor in providing good single polarization properties along with maintaining the desired b/a ratio described above.

The inner cladding 14 surrounds the moat 13. If the inner cladding 14 does not have a circular cross section, the diameter $D_{IN}$ of the inner cladding 14 is defined as the smallest distance from one side of the inner cladding's cross section to the oppositely situated side of the cross section. The diameter $D_{IN}$ of the inner cladding 14 is preferably at least 125 μm and more preferably at least 200 μm. It is even more preferable that inner cladding diameter $D_{IN}$ is at least 225 μm and most preferable at least 250 μm. More specifically, it is preferable that the inner cladding diameter $D_{IN}$ be about 125 μm to 2000 μm and more preferably about 150 μm to 1500 μm. It is even more preferable that $D_{IN}$ be about 150 μm to 350 μm. Applicants discovered that the thick inner cladding 14 and all-glass construction of the optical fiber work in synergy to allow the optical fiber to be coupled to high energy source, and to couple the high power into the core 12 without damaging the optical fiber, while elongated core 12 in conjunction with the moat 13 make this fiber a single polarization fiber.

It is preferable that the inner cladding's 14 cross-sectional area be at least 200 times larger than the cross sectional area of the rare earth doped core 12. It is even more preferable that the cross sectional area of the inner cladding 14 be between 300 and 3000 times larger than the cross sectional area of the core 12. For example, the cross sectional area of the inner cladding 16 may be 500, 700, 1000, 1200, 1500, 1600, 2000 or 2500 times larger than the cross sectional area of the rare earth doped core 12.

The silica based inner cladding 14 may have a circular outer perimeter, as shown in FIGS. 1A and 1C (preferably with an off-center situated core), or a non-circular outer perimeter as shown in FIGS. 2A, 2B and 2D, 2F. The advantage of non-circular inner cladding 14 is that non-circular shape improves the absorption of optical pump power into the core 12. The elongated core 12 may be located either at the geometric center of the inner cladding, or may be displaced from the geometric center of the inner cladding. The numerical aperture NA of the inner cladding 14 is defined as $(n_3^2-n_4^2)^{1/2}$, where $n_4$ is the index of refraction of the outer cladding layer 16. The inner cladding preferably has numerical aperture NA between 0.15 and 0.45 and more preferably between 0.3 and 0.4.

Surrounding the inner cladding 14 is an outer cladding 16. It is preferable that the outer cladding 16 be relatively thin, with wall thickness less than 80 μm and preferably between about 5 μm and 35 μm. It is most preferable that the wall thickness of the outer cladding 16 be between about 10 μm to 25 μm. It is preferable that the diameter of the outer cladding diameter ($D_{OUT}$) be about 145 to 2100 μm, more preferably between about 145 μm to 1600 μm and even more preferable that $D_{OUT}$ be about 145 μm to 500 μm. It is noted that the outer cladding 16 may not be circular. If the outer cladding 16 is not circular, $D_{OUT}$ is defined as the smallest distance from one side of the outer cladding's cross section to the oppositely situated side of the outer cladding's cross section.

According to this embodiment, the fiber core 12 includes, in weight percent:

| | |
|---|---|
| Rare earth | 0.1 to 2.5 wt %; |
| P | 0 to 5 wt %; |
| Al | 0.5 to 15 wt %; |
| Ge | 0 to 15 wt %; |
| F | 0 to 1 wt %. |

The rare earth dopants in the fiber core 12 provide active ions to enable either a gain or a lasing action. Exemplary rare earth dopants are Yb, Er, Nd, Tm, Sm and Tb. It is preferable that the amount of rare earth dopant in the core 12 be 0.5 wt % to 1.5 wt %. Phosphorus may be added to the core materials in order to lower the softening temperature of the core glass, which may be advantageous if the core is produced by the inside vapor deposition process. Phosphorus may also be utilized as a refractive index raising agent. However too much phosphorus (10% or more) provides nonlinearity through Stimulated Raman Scattering which may inhibit the lasing action. Aluminum may be added to the core as a de-clustering agent (for example, to de-cluster Yb, preferably at the ratio of Al to Yb of 5:1 to 10:1). The core 12 may also include Germanium which is an index raising dopant, and/or fluorine which is an index lowering dopant as well as a de-clustering agent.

The preferred ranges of the core 12 composition in weight percent are:

| | |
|---|---|
| Rare earth | 0.3 to 1 wt %; |
| P | 0 to 2 wt %; |
| Al | 2 to 8 wt %; |
| Ge | 3 to 20 wt %; and |
| F | 0.1 to 0.5 wt %. |

It is preferable that the amount of Ge in the core 12 be within 5 to 15 wt %. The Yb-doped core 12 will laze at 1.03–1.11 micron range.

It is preferable that the index lowering dopant of the moat 13 comprises Fluorine and/or Boron in weight percent:

| | |
|---|---|
| F | 0.5 to 5 wt %; and/or |
| B | 0.5 to 20 wt %. |

It is preferable that the moat 13 has less than 5 wt % of F, and 15 wt % or less of B. It is even more preferable that the amount of B and F be 2 to 4 wt % of F and 3 to 15 wt % of B.

It is preferable that the inner cladding 14 contain 5 wt % to 20 wt % Ge in order to provide high NA. It is even more preferable that the inner cladding comprise 5 wt % to 10 wt % Ge. It is noted that 5 wt % to 10 wt % Ge works well for many applications.

It is preferable that the index lowering dopant of the outer cladding 16 comprises Fluorine and/or Boron in weight percent:

| | |
|---|---|
| F | 0.5 to 5 wt %; |
| B | 0.5 to 20 wt %. |

The amount of dopant(s) for the outer cladding 16 is chosen to preferably result in inner cladding NA of between 0.15 to 0.5. However, it is preferable that the outer cladding 16 contain at least one of B or/and F. It is preferable that the amount of B is at least 3 wt %. It is preferable to have more than 1 wt % and more preferably more than 2 wt % of F along with more than 8 wt % of B in the outer cladding 16. It is preferable that the outer cladding 16 has less than 5 wt % of F, and less than 15 wt % of B. It is even more preferable that the amount of B and F be: 2 to 4 wt % of F and 3 to 15 wt % of B.

In general, a double-clad structure that could be used in a fiber laser or in an amplifier includes two claddings. A first (inner) multi-mode cladding 14 acts as a multi-mode pumping core. The inner cladding 14 is adjacent to the moat 13 and a second (outer) cladding 16 surrounds the first or the inner cladding cladding 14. The rare earth doped core 12 may be either single mode or multi mode at the core lasing wavelength. The inner cladding 14 serves as a waveguide with a high numerical aperture NA for the input (pumping) light. That is, the inner cladding serves as a pump cavity. The larger the inner cladding diameter, the more pump light is coupled into the inner cladding from the optical source. The cross-section of the first multi-mode inner cladding ($D_{IN}$ is the shorter dimension of the inner cladding) may be designed to have a desired shape, e.g., matched to the near field shape of the pump source or have any other which increases coupling efficiency of the (pump) light from the light source to the inner cladding. The numerical aperture of the inner cladding must be high enough to capture the output of the light source, such as the laser diode.

Recent progress in semiconductor laser technology has led to the creation of light sources utilizing discrete or arrayed broad-area laser diodes coupled to the intermediate fiber incorporated within the light source. The output power of this light source is more than 150 Watt at 976 nm at the output end of the intermediate fiber. The diameter of the intermediate fiber and NA of light source is 200 µm and 0.22 NA, respectively.

The light from this light source is then coupled to a double clad optical fiber via high NA and large aperture lenses. With this approach one can obtain 75–90% of coupling efficiency.

EXAMPLES

The invention will be further clarified by the following examples.

Example 1

FIG. 3A illustrates a refractive index profile an exemplary optical fiber of the present invention. More specifically, FIG. 3A depicts refractive index delta as vs. the radius for this exemplary optical fiber. This optical fiber has a Yb doped, silica based core 12 which is multi mode at the lasing wavelength of 1100 µm, a B or/and F doped silica based moat 13, a silica based inner cladding 14 having two sections of almost the same index of refraction (delta % ≈0) and an outer cladding 16 which is doped with fluorine and/or B. The NA of the inner cladding is 0.16. FIG. 3A illustrates that the refractive index difference (delta %) of the core 12 is about 0.7, that the moat 13 has refractive index difference (delta %) of −0.4% and that the fluorine doped outer cladding 16 has the refractive index delta of about −0.7%.

The specific composition for the optical fiber of this example is:

Core 12: 0.8 wt % $Yb_2O_3$; 9.5 wt % $P_2O_5$; 5.4 wt % $GeO_2$;
Moat 13: 1.3 wt % F;
Inner cladding 14: Pure Silica;
Outer cladding 16: 2.3 wt % F.

The optical fibers according of this example have a single polarization range (SPB) of 10 nm to 40 nm, depending on the size (along the minor axis) of the core 12. Larger SPB is possible if the core 12 contains a central, preferably elongated, air hole 11 (extending through the length of the optical fiber) with largest cross-sectional dimension of about 0.5 µm or less.

Figure 4:
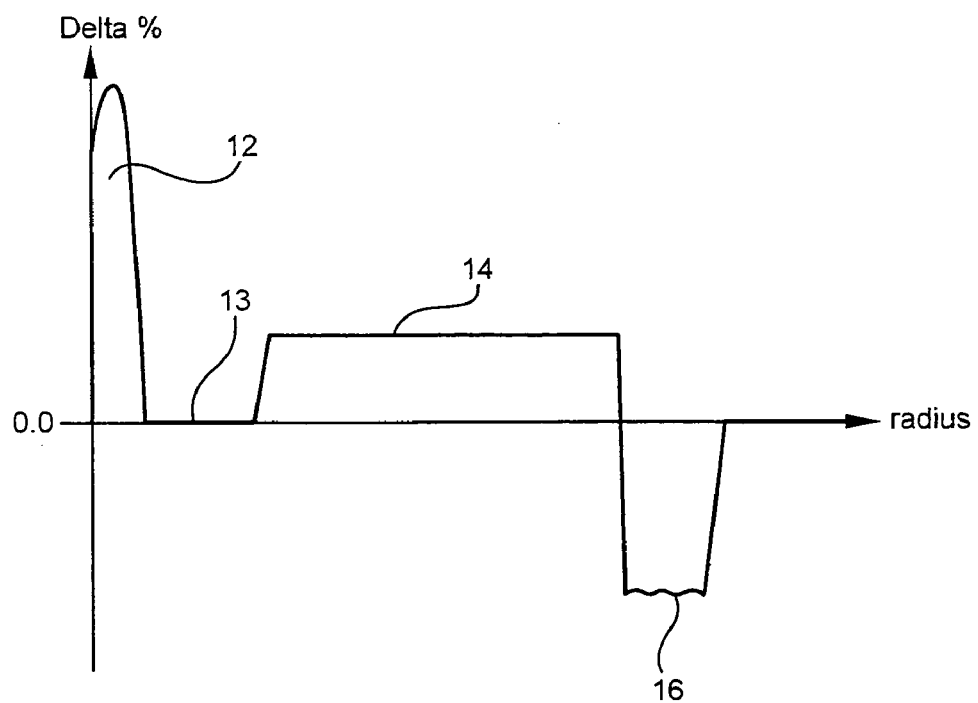
FIG. 4 illustrates schematically a relative a refractive index profile of another exemplary optical fiber of the present invention

Alternatively, the moat 13 can be made of pure silica and the inner cladding can be up-doped with an index raising dopant, for example Ge, so that $n_1 > n_2$, and $n_3 > n_2$. The exemplary profile for this fiber is illustrated schematically in FIG. 4.

Figure 5:
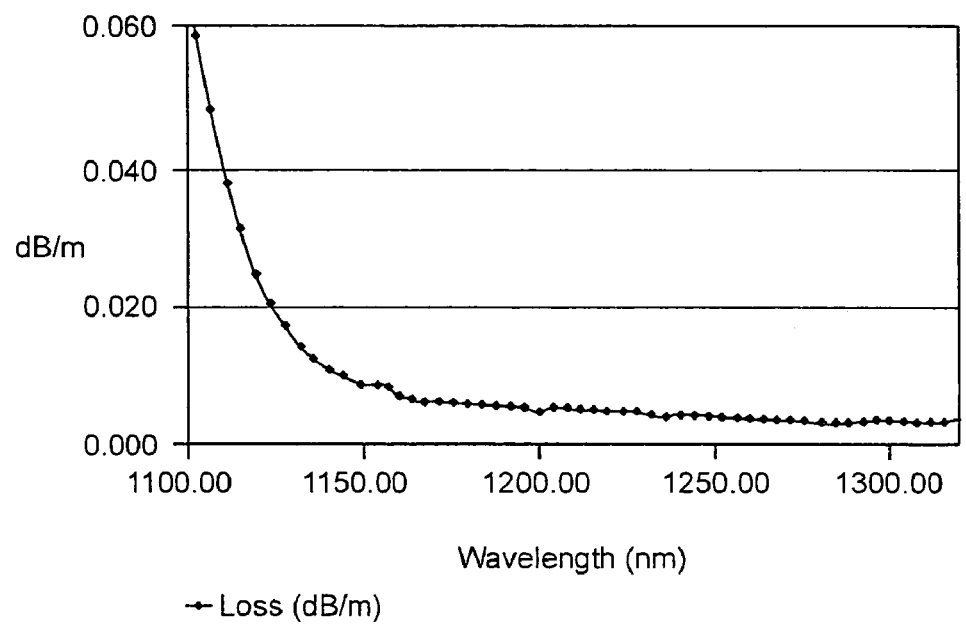
FIG. 5 is a graph illustrating passive core loss vs. wavelength of the optical fiber of FIG. 1A.

The double clad fiber produced by the OVD process is especially suitable for use in a higher power fiber laser device. FIG. 5 corresponds to the optical fiber of FIG. 1A. More specifically, FIG. 5 illustrates the low passive loss, for example 3 dB/km at 1280 nm, achieved in the Yb-doped core of the fiber of FIG. 1A. The passive loss of the core (also referred to as a background loss) is the inherent loss from the core materials without the absorption-effect from the active dopants such as Yb or Er etc. The fiber has good power-handling capability and operates well with optical sources that provide optical (pump) power of over 10 Watts. The optical fiber 10 of this example has absorption per unit length (when launching pump power in the inner cladding) in the range of 0.1 dB/m to 2 dB/m.

Figure 6:
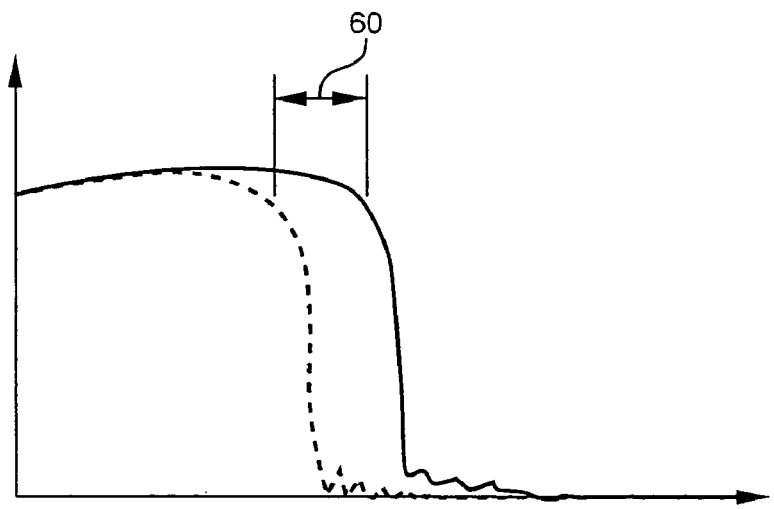
FIG. 6 is a graph illustrating single polarization property of the optical fiber of FIG. 1A.

FIG. 6 illustrates transmission spectrum of double clad single polarization fiber shown in FIG. 1A. The single polarization bandwidth 60 is around 20 nm, centered at 1080 nm in which lasing taking place. In this exemplary fiber the first cutoff wavelength $\lambda_1$ is about 1070 nm and the second cutoff wavelength $\lambda_2$ is about 1090 nm.

Example 2

Figure 3B:
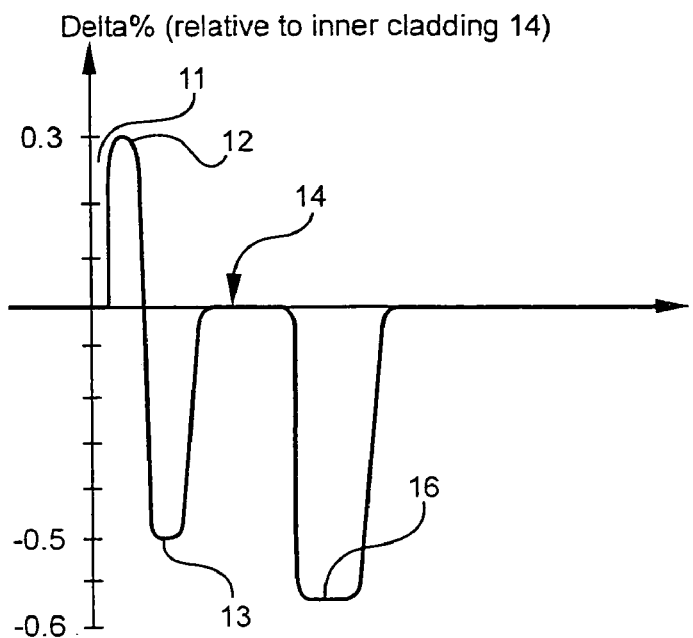
FIG. 3B illustrates a relative a refractive index profile of an exemplary optical fiber of FIG. 1C.

FIG. 3B illustrates schematically a refractive index profile another exemplary optical fiber of the present invention. The vertical axis of the graph of FIG. 3B depicts delta values relative to that of the inner cladding. More specifically, FIG. 3B depicts schematically refractive index delta as vs. the radius for this exemplary optical fiber. This optical fiber has a Yb doped, silica based core 12 with a center air hole 11, B or/and F doped silica based moat 13, a silica based inner cladding 14 (pure or doped silica) and an outer cladding 16 which is silica doped with fluorine and/or B. FIG. 3B illustrates that the refractive index difference (delta %) of the core 12, relative to the inner cladding 14, is about 0.3, that the moat 13 has refractive index difference (delta %) of −0.5% and that the fluorine doped outer cladding 16 has the refractive index delta of about −0.7%.

The geometrical parameters of this fiber and two other exemplary fibers are provided in Table 1, below. The core delta (%) of these exemplary fibers ranges from 0.1% to 3%, relative to the inner cladding's index of refraction. All other parameters were adjusted to provide the desired SP Bandwidth, such that the SP wavelength range includes a 1060 nm wavelength. We have found that the higher core delta fiber (with the same size air hole) has correspondingly smaller core dimensions than the lower core delta fiber with the same SP wavelength (for example, 1060 nm). On the other hand, when the core delta was lowered, the SP Bandwidth became smaller. However, even with a core delta of 0.1%, relative to the inner cladding, the SP Bandwidth (situated around the desired wavelength) is larger than 20 nm.

TABLE 1

|  | a'/2 (air hole) | b'/2 (air hole) | a/2 (core) | b/2 (core) | d/2 (moat) | c/2 (moat) | Core delta (%) | Moat delta (%) |
|---|---|---|---|---|---|---|---|---|
| Fiber 1 | 0.12 | 0.5 | 3.45 | 3.45 | 8 | 8 | 0.3 | −0.5 |
| Fiber 2 | 0.12 | 0.5 | 4.26 | 4.26 | 8 | 8 | 0.2 | −0.4 |
| Fiber 3 | 0.12 | 0.5 | 6.175 | 6.175 | 8 | 8 | 0.1 | −0.4 |

All delta values in Table 1 are measured relative to the inner cladding 14. The preferred inner cladding 14 dimensions of the fibers of Table 1 are between 65 µm and 450 µm. More preferably the inner cladding diameter $D_{IN}$ is at least 200 µm. A larger inner cladding facilitates more pump power to enter into the optical fiber, thus more pump power is absorbed by the core 12, providing greater gain. The thickness of the outer cladding of the fibers of Table 1 is relatively small, preferably between 5 µm and 35 µm.

Table 2 provides the values for the cutoff wavelength and for the 5 µm bandwidth for the optical fibers of Table 1.

TABLE 2

|  | First cutoff wavelength $\lambda_1$ | Second cuttoff wavelength $\lambda_2$ | SP Bandwith |
| --- | --- | --- | --- |
| Fiber 1 | 1038.0 | 1068.0 | 30 nm |
| Fiber 2 | 1046.0 | 1072.5 | 26.5 nm |
| Fiber 3 | 1048.0 | 1070.0 | 21.5 nm |

The specific core material composition for the optical fibers of Tables 1 and 2 are:

Core 12, fiber 1: 0.5 wt % $Yb_2O_3$; 4.5 wt % $Al_2O_3$; 6.6 wt % $GeO_2$; 90.2 Wt % $SiO_2$;

Core 12, fiber 2: 0.5 wt % $Yb_2O_3$; 4.5 wt % $Al_2O_3$; 4.8 wt % $GeO_2$; 90.2 wt % $SiO_2$;

Core 12, fiber 3: 0.5 wt % $Yb_2O_3$; 4.5 wt % $Al_2O_3$; 3 wt % $GeO_2$; 92 wt % $SiO_2$.

The specific moat material composition for the optical fibers of Tables 1 and 2 are:

Moat 13, fiber 1: pure silica;

Moat 13, fiber 2: 1.8 wt % $GeO_2$ doped silica

Moat 13, fiber 3: 3.6 wt % $GeO_2$ doped silica.

The inner cladding 14 material composition for the optical fibers 1–3 of Tables 1 and 2 is 9 wt % $GeO_2$ doped silica. It is noted that the inner cladding's delta, relative to that of pure silica, is 0.5%. The outer cladding material composition for the optical fibers 1–3 of Tables 1 and 2 is 9 wt % $B_2O_3$ and 2.7 wt % F doped silica.

The Process for Making Fiber

The fiber of FIGS. 1A, 1C and 2A–2F is produced by the outside-vapor-deposition process (OVD). The OVD process is a way of making optical fiber by depositing from the desired vapor ingredients (including silica and the desired dopants) reacting with oxygen in a flame to form the soot-particles on a bait rod, for making soot-preform. The soot-preform is then consolidated into solid glass in a high temperature furnace, after the bait rod is removed. The core/inner cladding/outer cladding compositions are achieved by utilizing different vapor-ingredients for each of the layers in the soot preform forming process. The core preform is generated first, then consolidated, followed by core/inner cladding preform generation and consolidation, which in turn, is followed by the outer cladding outside vapor deposition process and another consolidation step. The final preform is then drawn into double-clad single polarization optical fiber 10 by known fiber-drawing methods.

More specifically, the following steps are utilized to make the rare earth doped double clad single polarization fiber of FIGS. 1A, 1C and 2A–2F.

Figure 7:
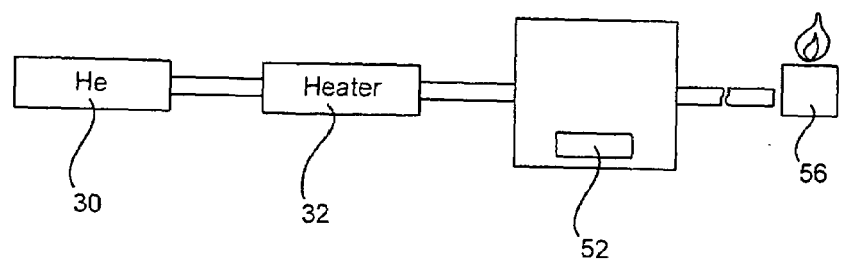
FIG. 7 is a schematic illustration of $AlCl_3$ delivery mechanism.
Figure 8:
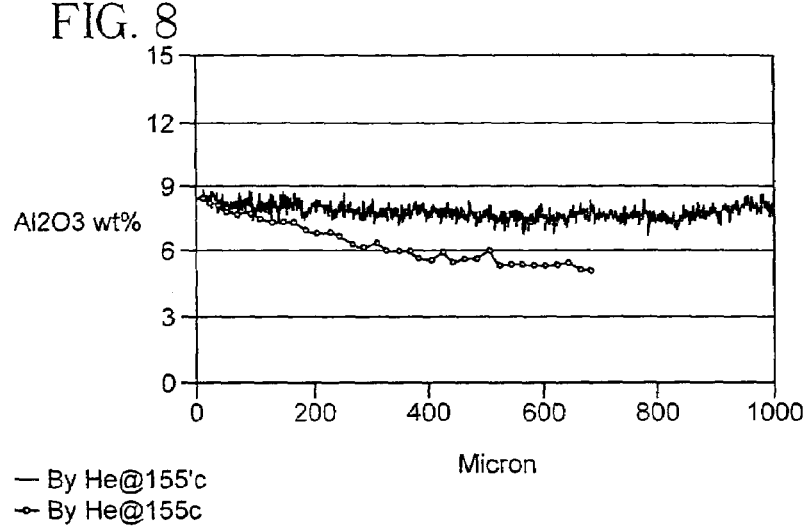
FIG. 8 illustrates $Al_2O_3$ concentration in a preform which resulted from Argon gas delivery (bottom curve) and heated Helium gas delivery (top curve)

1. Core cane formation. The core cane is formed first. The core is manufactured, for example, by a standard OVD process. The core materials are deposited onto the bait rod during the laydown step. The exemplary vapor-precursor-materials used to make the fiber core cane are $Yb(fod)_3$, $AlCl_3$, $SiF_4$, $SiCl_4$, $GeCl_4$ and tri-ethyl borate (or $BCl_3$ or $BBr_3$). Other rare-earth materials may be utilized either in addition to Yb, or instead of Yb. During the core deposition process we achieved a uniform $AlCl_3$ gas-phase delivery. This was accomplished by utilizing heated inert Helium as carrier gas 30 (instead of Argon gas) for $AlCl_3$ delivery illustrated schematically in FIG. 7. As solid $AlCl_3$ changes into vapor (gas) phase, it consumes a large amount of heat. Helium gas has high thermal conductivity; effectively transfers heat to $AlCl_3$, and maintains constant vapor pressure of $AlCl_3$. It is preferable that Helium gas is provided at a temperature within 150° C. to 180° C. range. As illustrated in FIG. 7, the heated Helium gas is provided by the He gas heater 32 to the oven 50 containing $AlCl_3$ vessel 52. The relatively high Helium gas temperature helps to maintain the $AlCl_3$ containing vessel 52 at a constant temperature of about 140° C.–160° C. In order to make the optical fiber of this example, Helium gas was heated via heater 32 to 168° C. and the vessel 52 temperature was held constant at 145° C. Higher vessel temperature results higher concentration of Al in the preform. In addition, the Helium gas flow rate was also adjusted for the most uniform delivery throughout the core doping process. In this example, a 10% flow-rate slope (liter/min) is used for the delivery. (The increase in flow rate with subsequent passes was utilized for all other dopants of the core and claddings.) Heated Helium gas carries $AlCl_3$ vapor via a heated gas line 54 to the flame burner (gas burner) 56. To produce the core preform of this example, a 100 passes of core deposition process is started with 1.2 liter/min (pass #1) and ended (after pass # 100) with 1.65 liter/min, resulting in soot preform core thickness of about 2 mm to 3 mm. Heated Helium based $AlCl_3$ delivery may be utilized not only to form a fiber core, but to also provide Al doping to other fiber layers (e.g. cladding), if uniform Al doping of such layers is desired. Furthermore, heated Helium assisted delivery may be also utilized for materials other than $AlCl_3$, which are also endothermic (i.e. heat-absorbing). An Argon gas delivery instead of the Helium gas delivery delivery of $AlCl_3$ may be utilized, but a Helium gas delivery of $AlCl_3$ results better uniformity of $Al_2O_3$ concentration. (See FIG. 8). It is preferable that $Al_2O_3$ is evenly distributed throughout the core layer because its presence assists in de-clustering of rare earth dopant(s) within the core. This results-in high laser/amplifier efficiency through reduced quenching. This delivery process can also be utilized in Al doped (for example, in order to replace Ge) transmission fiber (i.e. fiber without rare-earth dopants in the core) when a fiber layer with relatively high index of refraction (i.e. higher than silica) is needed.

Figure 9:
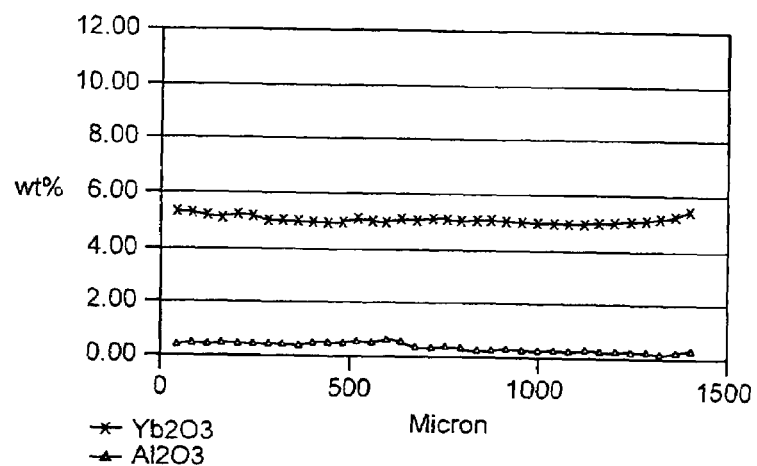
FIG. 9 is a graph illustrating $Yb_2O_3$ and $Al_2O_3$ concentration within a core optical fiber preform.

As shown in FIG. 9, the heated Helium delivery of $AlCl_3$ resulted in a very uniform distribution of Yb and Al throughout the preform core, which results in uniform concentration of Yb and Al within the fiber core 12. More specifically, the resultant variability of $Al_2O_3$ concentration in the core is less than 2 wt % and preferably less than 0.5 wt % and more preferably less than 0.25 wt %, especially for maximum $Al_2O_3$ concentration of over 3 wt %. It is also preferable that the ratio of max wt % to min wt % of $Al_2O_3$ concentration in any given fiber layer (e.g. core, cladding, etc.) be less than 2:1, preferably less than 1.5:1, more preferably less than 1.2:1, and even more preferably less than 1.1:1, especially for maximum $Al_2O_3$ concentration of over 3 wt %.

The Yb vapor delivery is carried by Argon gas and is accomplished by heating organometallic $Yb(fod)_3$ in the temperature range of 150° C.–180° C., which results in a soot preform core with $Yb_2O_3$ concentration from about 0.2 wt % to 3 wt %. In order to make the optical fiber 10 of this example, the $Yb(fod)_3$ containing vessel temperature of 163° C. was used to achieve the $Yb_2O_3$ concentration of about 0.6 wt %. The delivery of other materials is carried out by conventional oxygen delivery at temperatures below 100° C.

Figure 10:
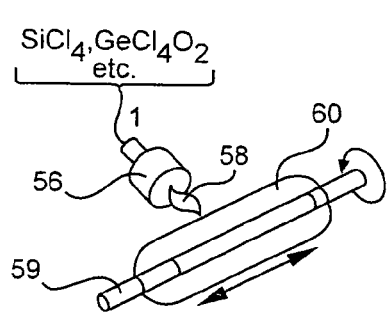
FIG. 10 is a schematic illustration of the formation of a core soot preform.

More specifically, according to one embodiment of the present invention, the $Yb(fod)_3$, $AlCl_3$, $SiF_4$, $SiCl_4$ and $GeCl_4$ are delivered to a gas burner 56. (See FIG. 10.) The gas burner 56 operates at a temperature of about 2000° C. The pre-determined amounts of various vapor-phase materials delivered for each core (or clad) stage are carried by oxygen provided to the burner 56, and react in the burner flame 58 where the desired glass-soot particles formed. The soot particles are then deposited onto a rotating bait-rod 59 or core cane 60 through the thermopheretic mechanism to result in the designed soot-preform 62 which will be used to manufacture single polarization fiber with the Yb-doped single-mode core.

Figure 13:
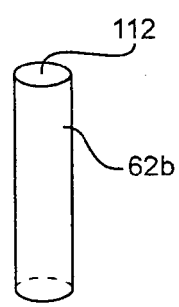
FIG. 13 illustrates schematically a core cane utilized to manufacture the fiber of FIGS. 1A, 1C and 2A–2F.

After the core soot preform layer is layered down and the core soot preform 62 is cooled to room temperature, the bait rod 59 is removed from the center of core soot preform 62. The removal of the bait rod 59 leaves a center hole (preferably circular or elliptical in cross-section) in the center of the core soot perform 62. The core soot preform 62 is then consolidated (densified into the solid glass) to become a solid glass-preform 62A, with or without the center hole, according to the desired fiber geometry. The solid glass-preform 62A is then drawn into core cane 62B. (See FIGS. 11 and 13.) The presence or absence of the hole 11 in the core 12 is controlled by the proper application pressure over the centerline. For example, application of positive pressure (air is blown through the center hole) will keep the center hole open, while negative pressure will close the hole.

Applicants discovered that a proper choice of high temperature and fast down-feed rate during consolidation results in low crystallization formation in the resulting solid glass preform, which results in an optical fiber having very low passive (background) loss, and also eliminates the conventional double-redraw process associated with Al doped blanks.

Figure 11:
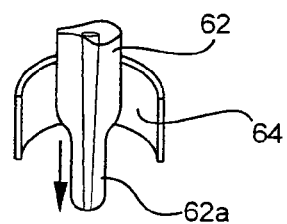
FIG. 11 illustrates consolidation of a soot preform into a glass preform.

More specifically, soot preform 62 is down fed relative to the furnace at the rate and temperature sufficient to minimize crystallization such that the background loss of the resultant fiber core is less than 8 dB/km, and preferably 3 dB or less, at a wavelength of 1280 nm. As illustrated in FIG. 11, the 'core' soot preform 62 is consolidated into solid glass-preform 62A in a high temperature (1400° C. to 1600° C.) furnace 64. It is preferred that the furnace temperature during consolidation be 1500° C. to 1600° C., and more preferably 1530° C. to 1580° C. In order to produce the optical fiber 10 of this example we utilized the furnace temperature of 1550° C. Applicants found that for temperatures of below 1500° C. the preform glass forms crystals and the amount of crystallization is significantly reduced with furnace temperatures of above 1530° C. While in the furnace, the soot preform 62 is moved relative to the furnace 64 (e.g., down-fed) at a rate of 7 mm/min or faster. It is preferred that this rate be 8 mm/min to 12 mm/min. The optical fiber of this example made by down-feeding the soot preform 62 at the rate of 9 mm/min. It is noted that instead of down-feeding the soot preform, the soot preform may be held in a constant position and the furnace may be moved instead. Thus, by specifying that the soot preform is moved relative to the furnace, applicants intend to cover any relative movement between the soot preform and the furnace. Generally, it is recommended that the higher the furnace temperature, the faster the rate of relative motion between the furnace and the soot preform.

Figure 12:
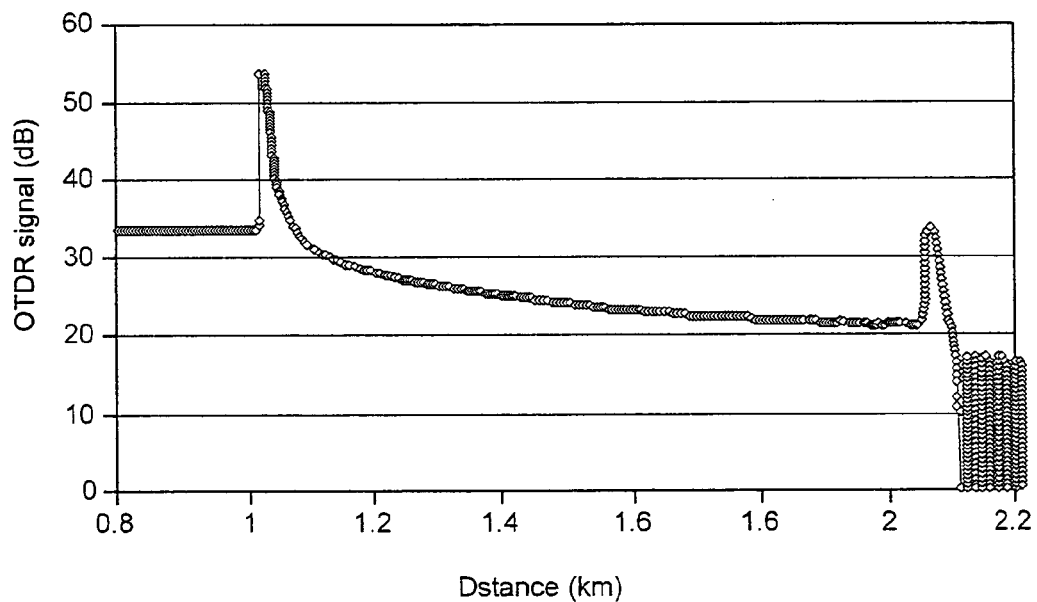
FIG. 12 illustrates inner cladding background loss of an exemplary fiber.

With the above described high consolidation temperatures and fast down-feed rate, the resultant optical fiber 10 has the core background loss of less than 8 dB/km. More preferably, the optical fiber exhibits core background loss of less than 5 dB/km. In this example the background loss of the core is less than 3 dB/km. The core background loss was measured by making (single mode) optical fiber without the outer cladding and measuring the background loss of this fiber. (See FIG. 12)

The core soot preform 62 has sufficient amount of Ge to produce the required core delta. After the core preform 62 has been consolidated, as described above, it is drawn into the core cane 62B. The core cane 62B is preferably 1 meter long and about 8 mm in diameter. The core cane 62B is illustrated schematically in FIG. 13. If the production of fiber with a centeral air hole is desired, this draw step is performed with a positive pressure (for example, about 1 psi) along the centerline, to keep the hole from closing during the draw process. Alternatively, vacuum could be used to close the center hole.

Figure 14:
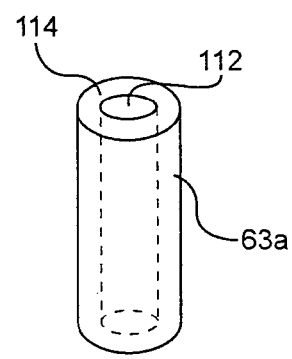
FIG. 14 illustrates schematically a core-moat cane utilized to manufacture the fiber of FIGS. 1A, 1C and 2A–2F.

2. First blank formation. The core cane 62B is overclad with down doped silica soot to form a core/moat (soot) blank (referred herein as the first bank 63). The first clad blank is then consolidated to form cane 63A. The first blank 63 has a core to the moat diameter ratio of 0.4 to 0.6. Cane 63A is illustrated schematically in FIG. 14.

Alternatively a sleeving process may be utilized to form cane 63A, by placing a down doped silica sleeve around the core cane 62A. If the center air hole is desired, the sleeving process is performed with a appropriate amount positive pressure (about 1 psi, for example) along the centerline. Application of negative pressure (vacuum) will close the center hole.

More specifically, in order to produce a down doped inner core layer or a moat, soot particles of silica with index lowering dopants may be deposited onto the core cane 62A. The index lowering dopants are, for example, B and F. The soot particles of B and F provide low refractive index (less than that of pure silica). If the moat region or the down-doped inner core region is desired, the $B_2O_3$ and $SiO_2$ are vapor deposited to form a $B_2O_3$ and $SiO_2$ soot layer by using tri-ethyl borate and $SiCl_4$ and/or $SiF_4$ delivered to the burner. The blank covered with the $B_2O_3$ doped silica soot layer is then Fluorine doped during the consolidation step by using $SiF_4$ gas provided to the consolidation furnace. During this consolidation step, the consolidation furnace is operated at the temperature range of 1300° C.–1400° C. At these consolidation temperatures Fluorine diffuses into the boron/silica soot layer, but does not penetrate into the underlying (core) glass layer. In some of the exemplary embodiments of the present invention when the core delta was 0.3% $\Delta$, the depressed index of the first clad layer (relative to that of pure silica) was about −0.3 to −0.5% $\Delta$.). In some of the exemplary embodiments of the present invention when the core delta was about 1% $\Delta$, the depressed index of the first clad layer (relative to that of pure silica) was about −3.35 to −0.7% $\Delta$.) and the SPB was 20 nm to 25 nm wide. The clad blank 63 is then drawn into canes 63A.)

Figure 15:
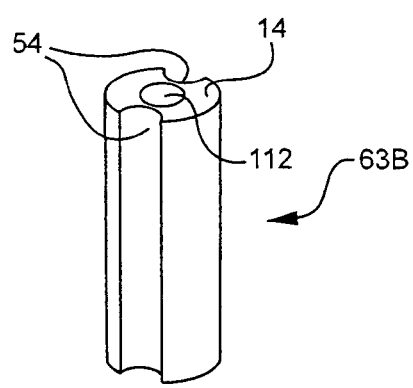
FIG. 15 illustrates schematically a grooved cane utilized to manufacture the fiber of FIGS. 1A, 1C and 2A–2F.

3. Grooved cane formation. The cane 63A includes sections 112, 113 which correspond to the core 12 and the moat 13 of the optical fiber 10 and which has a core/moat ratio of about 0.45. Cane 63A is preferably about 1 meter long and about 8 mm in diameter. Grooves 54 are then ground into the diametrically opposite longitudinal sides of the cane 63A to a width of about 6.4 mm and to a depth of about 8 to 10 mm, thereby forming grooved cane 63B. (See FIG. 15.) The groove depth depends on the thickness of the first clad layer, but should be such that its bottom substantially abuts the section 112 (corresponding to the fiber core 12), as illustrated in FIG. 15. The grooved cane 63B is HF etched for about 30 minutes to clean any grinding residue and then redrawn to an appropriate size cane (OD of about 8 mm).

Figure 16:
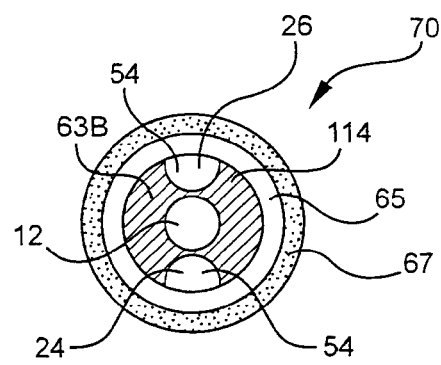
FIG. 16 illustrates schematically a glass tube with the inserted grooved cane of FIG. 15.

The grooved and redrawn cane 63B is then inserted into a 1 meter long silica tube or sleeve 65 overclad with silica soot 67 (for example, about 800–1000 gms.), as shown in FIG. 16, to form a preform subassembly 70. Silica overcladding 67 method on the sleeve 65 is preferably produced by an Outside Vapor Deposition (OVD). The exemplary silica tube 65 may have an inner diameter of about 8.8 mm and an outer diameter of about 11.8 mm which supports a layer of silica soot 67. The silica tube baring soot is cleaned, both inside and outside, with a chemical solvent or alcohol for example, prior to the insertion of the etched and re-drawn cane 63B into the tube 65. If needed, the two holes 24, 26 in the preform subassembly 70 may be further etched via HF to enlarge the holes.

Figure 17:
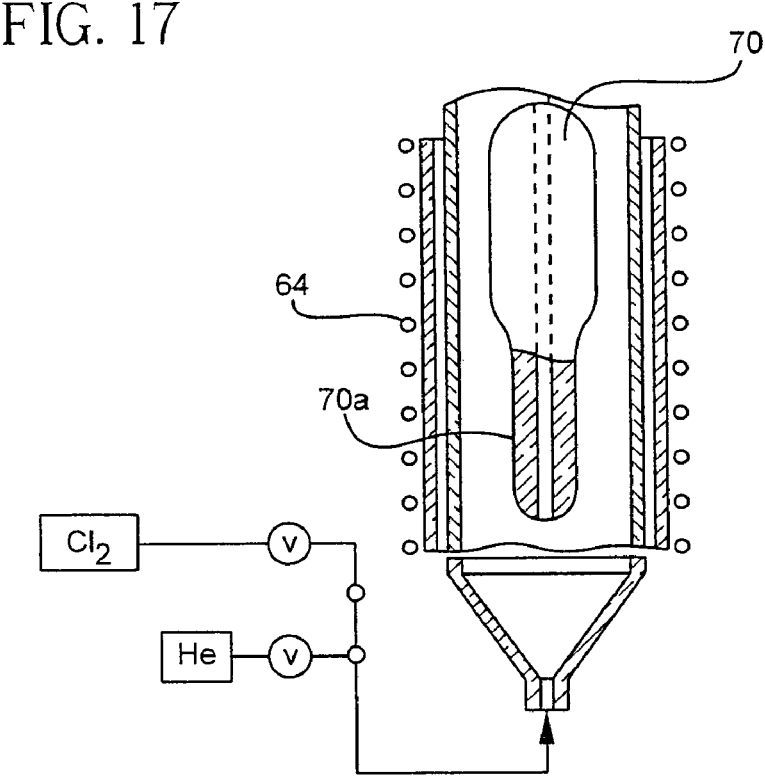
FIG. 17 illustrates schematically an exemplary consolidation process utilized to manufacture the fiber of FIGS. 1A, 1C and 2A–2F.
Figure 18:
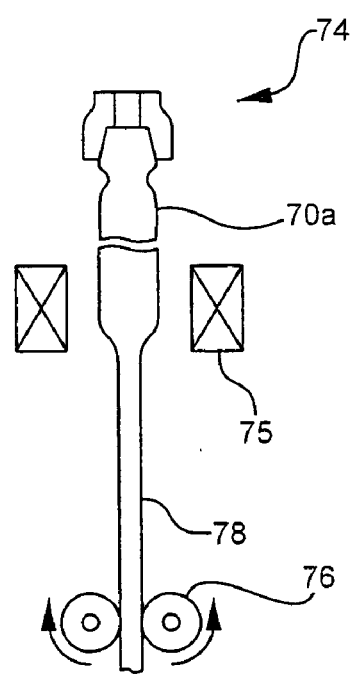
FIG. 18 illustrates schematically a redraw tower utilized to manufacture the fiber of FIGS. 1A, 1C and 2A–2F.

The preform subassembly 70 of FIG. 16 is then consolidated in accordance with a conventional consolidation process as shown in FIG. 17 by first drying in a consolidation furnace 64 in an atmosphere of $Cl_2$, and then consolidating in the furnace in a He-containing atmosphere to produce a consolidated preform 70A. The consolidated preform 70A is then inserted into a redraw tower 74 as shown in FIG. 18. The preferred down feeding rate is about 7 mm/min. Heat is applied to preform 70A by heating element 75 and it is drawn down by tension applying wheels 76 into an approximately 7–8 mm diameter cane 78. While the redraw process (drawing to a smaller diameter core cane from the preform) is occurring, the holes 24, 26 are closed by applying vacuum to the holes, thus forming an elongated core. The center hole in the core is kept open by applying positive pressure (for example, about 1 psi) inside the hole along the center line CL.

Figure 19:
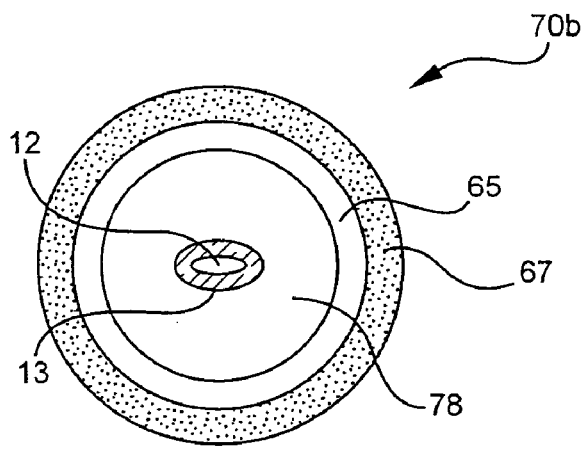
FIG. 19 illustrates a preform subassembly that includes a silica tube overclad with silica soot.

This cane 78, now having an elliptically shaped core (with or without the center hole), is again inserted into a 1 meter long silica tube 65A which is overclad with about 1000 grams of silica soot 67A, as shown in FIG. 19 to form preform subassembly 70B. This preform subassembly 70B is consolidated in the same manner as heretofore to form consolidated blanks 70C with the outer silica layer corresponding to the cladding 14 of the optical fiber 10. Thus, the consolidated blanks 70C includes portions 112, 113 and 114 which will form the basis for the core 12, the moat 13, and the inner cladding 14 of the optical fiber 10.

It is noted that the glass portion 114 may also be up-doped or down doped in order to either rise or lower its index of refraction relative to that of pure silica.

Figure 20:
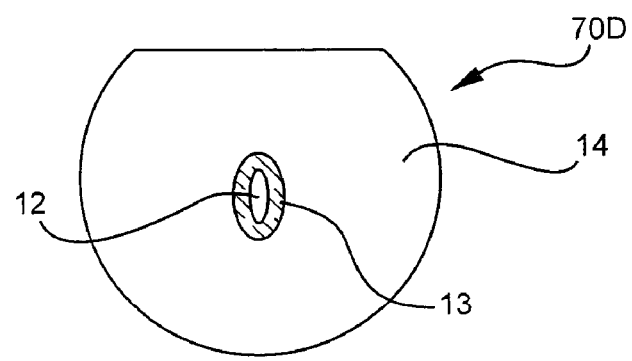
FIG. 20 illustrates a machined core/inner clad blank.

The consolidated blanks 70C are then machined, if needed, to desired shape. Breaking circular symmetry in the inner clad layer enhances pump light absorption efficiency. A machined core/inner cladding blank 70D is illustrated schematically in FIG. 20.

Figure 21:
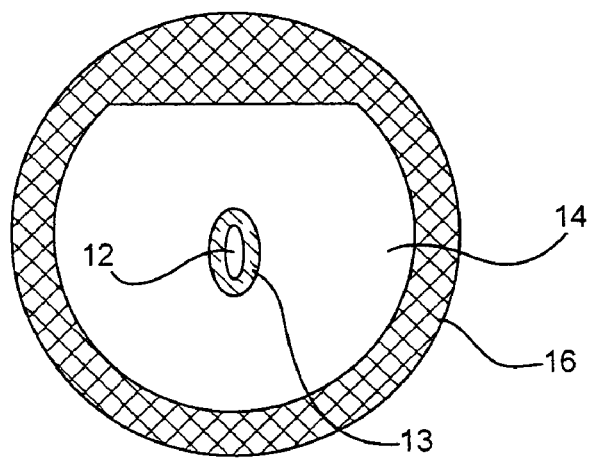
FIG. 21 illustrates a consolidated blank after the core/innerclad blank it has been machined as shown in FIG. 20 and overclad with the silica based outerclad material.

The machined blank 70D (or blank 70C) is overclad again, for example by $SiO_2$ with index lowering dopants (for example B and/or F, to provide lower refractive index than that of a pure silica)) and then consolidated to a consolidated blank 71. The down-doped silica layer of the consolidated blank 71 will form the second, or outer cladding 16 of the optical fiber 10. FIG. 21 illustrates schematically an exemplary consolidated blank 71. If boron is used in overcladding, it is preferred that consolidation is performed in Fluorine environment. In this example, the index lowering dopants for the outer cladding 16 are B and F.

More specifically, $B_2O_3$ and $SiO_2$ were vapor deposited on the ground glass preform to form a $B_2O_3$ and $SiO_2$ soot layer by using tri-ethyl borate ($BCl_3$ or $BBr_3$) and $SiCl_4$ delivered to the burner. The blank (i.e. machined or ground glass preform) covered with the $B_2O_3$—doped silica soot layer was then Fluorine doped during the consolidation step by using $SiF_4$ gas provided to the consolidation furnace. During this second consolidation step, the consolidation furnace is operated at the temperature range of 1300° C.–1400° C. At these consolidation temperatures Fluorine diffuses into the boron/silica soot layer, but does not penetrate into the underlying glass layer. The optical fiber of this example was produced by utilizing consolidation temperature of 1350° C., so as to facilitate adequate Fluorine doping through diffusion. In this example, the fourth layer of the preform (outer cladding) has a shape similar to that of the third layer (inner cladding).

Figure 22:
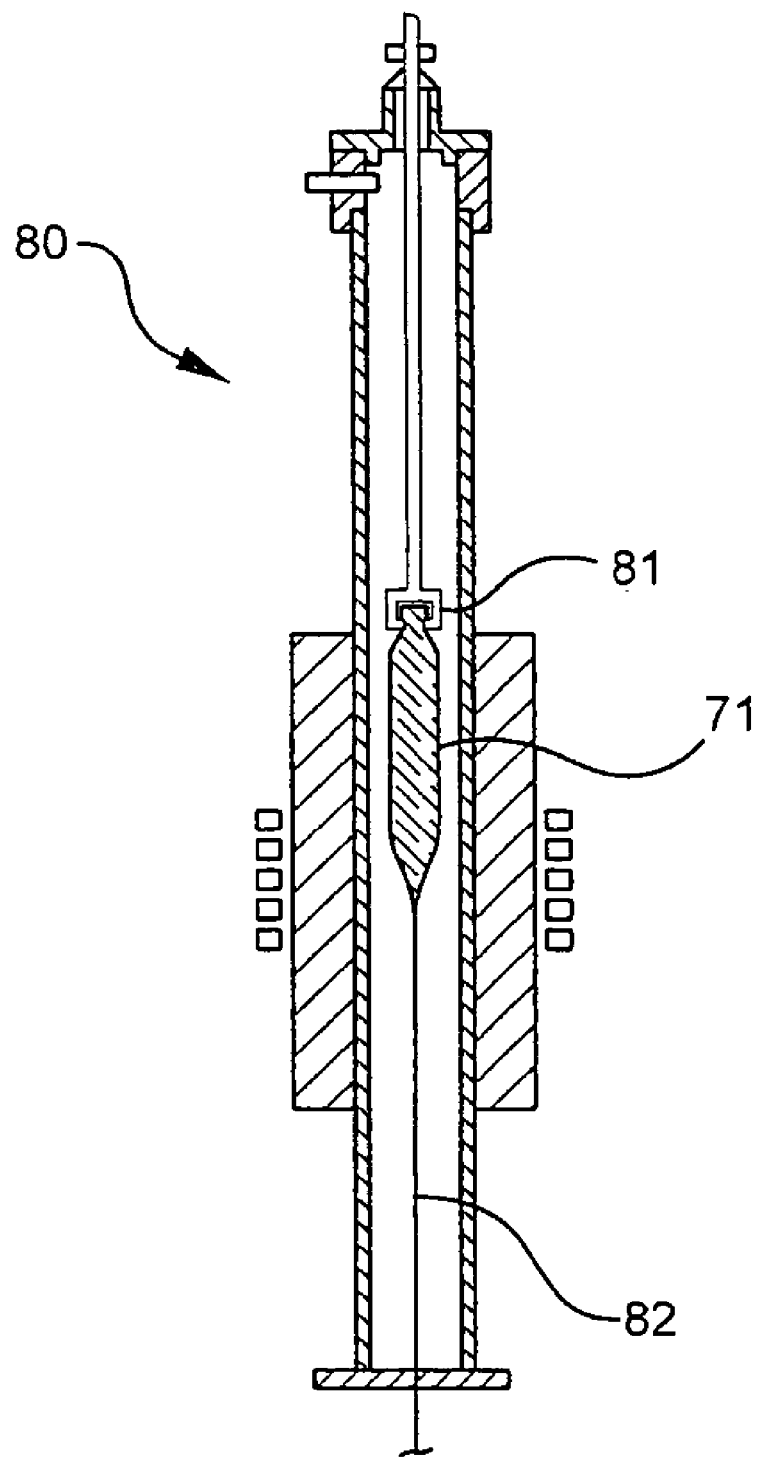
FIG. 22 illustrates schematically a process for drawing fiber utilized to manufacture the fiber of FIGS. 1A, 1C and 2A–2F.

The consolidated blank 71 is then suspended from a handle 81 in a draw furnace 80 as shown in FIG. 22 and a fiber 82 is drawn therefrom. The draw speed was about 1 m/sec. The resulting fiber has an elliptically shaped core, with or without the center air hole. During the draw, if the presence of the center air hole is desired, a small positive pressure (for example of about 1 psi or less) is applied along the center line to keep the hole from closing and to control the shape of the hole.

As should be recognized, the elongation of the core (and/or control for the presence/absence and the size of the central air hole) may occur in the redraw step, the draw step, or combinations thereof to achieve the desired aspect ratio of the core and the size, shape of the central air hole.

The resulting all-glass double-clad optical fiber has the following core, inner-cladding, outer-cladding compositional format:
Core: $Yb_2O_3:Al_2O_3:SiO_2:GeO_2:F$;
Moat: $B_2O_3:F:SiO_2$.
Inner cladding: $SiO_2$, or $SiO_2:GeO_2$;
Outer cladding: $B_2O_3:F:SiO_2$.

The amount of each dopant is optimized to ensure the high laser efficiency and SP bandwidth in the operating wavelength range.

It will be apparent to those skilled in the art that variations and modifications can be made to the present invention without departing from the scope of the invention. For example, although step index structures are show, other graded index structures may be employed. Thus, it is intended that the present invention cover the modifications and variations of this invention provided they come within the scope of the appended claims and their equivalents.

What is claimed is:

1. An optical fiber, comprising:
a rare earth doped silica based elongated core with a first refractive index ($n_1$) with an aspect ratio of 1.5 to 10 and a minimum dimension a;
a silica based moat abutting and at least substantially surrounding said core, said moat having a dimension d and a refractive index $n_2$, wherein $n_2 < n_1$ and the ratio of d/a is between 2.0 to 7.0;
a silica based inner cladding surrounding the moat, the inner cladding having a third refractive index ($n_3$), wherein $n_1 > n_3$; and $n_3 > n_2$ a silica based outer cladding surrounding said inner cladding, the outer cladding having a fourth refractive index ($n_4$), such that $n_4 < n_3$;
the optical is a single polarisation fiber with a single polarization at the operating wavelength band.

2. The optical fiber according to claim 1 wherein said moat is silica down-doped with at least one dopant selected from the group consisting essentially of: boron and fluorine.

3. The optical fiber according to claim 1 wherein said moat region has a non-circular shape.

4. The optical fiber according to claim 1 wherein said inner cladding has a non-circular shape.

5. The optical fiber according to claim 1, wherein said core is elliptical.

6. The optical fiber according to claim 1, wherein said moat is laterally elongated.

7. The optical fiber of claim 1 wherein said fiber has single polarization within a single polarization band with the bandwidth is at least 10 nm.

8. The optical fiber of claim 1 wherein said fiber has single polarization within a single polarization band with the bandwidth is at least 20 nm.

9. The optical fiber of claim 1 wherein said fiber has single polarization within a single polarization band with the bandwidth between 20 and 40 nm.

10. The optical fiber of claim 1 wherein said single polarization band is centered around one of the following wavelengths: 1060 nm, 1310 nm, 1550 nm.

11. The optical fiber of claim 1 wherein the core contains germania-doped silica and the moat contains silica doped with at least one of fluorine and or boron.

12. The optical fiber of claim 1 further comprising a maximum relative refractive index of the core is less than 0.5%.

13. The optical fiber of claim 1 further comprising a relative refractive index of the moat of more negative than −0.15%.

14. The optical fiber of claim 1 further comprising a relative refractive index (Δ3) of the moat between −0.15% and −0.8%.

15. The optical fiber of claim 1 wherein said core has a short core dimension between 1 to 5 microns and a long core dimension between 1.5 and 15 microns.

16. The optical fiber according to claim 1, further including a single air hole inside said core.

17. The optical fiber according to claim 16, wherein said air hole has a shortest dimension that is less than 1 μm.

18. The optical fiber according to claim 16, wherein said air hole has a shortest dimension that is less than 0.5 μm.

19. An optical fiber, comprising:
(i) a rare earth doped silica based elongated core with a first refractive index ($n_1$), a minimum dimension a, and a center air hole situated inside the core;
(ii) a silica based moat abutting and at least substantially surrounding the core, the moat having a dimension d and a refractive index $n_2$ wherein $n_2 < n_1$ and the ratio of d/a is between 2.0 to 7.0;
(iii) a silica based inner cladding surrounding the moat, the inner cladding having a third refractive index ($n_3$), wherein $n_1 > n_3$, and $n_3 > n_2$;
(iv) a silica based outer cladding surrounding said inner cladding, the outer cladding having a fourth refractive index ($n_4$), such that $n_4 < n_3$; and
the optical fiber is a single polarization fiber with single polarization at the operating wavelength band and has SPB of at least 20 nm.

* * * * *